United States Patent [19]
Ogiso et al.

[11] 3,898,679
[45] Aug. 5, 1975

[54] ELECTRICALLY DRIVEN CONTROL DEVICE FOR A CAMERA

[75] Inventors: Mitsutoshi Ogiso, Kawasaki; Hiroshi Aizawa, Tokyo; Susumu Kozuki, Kawasaki, all of Japan

[73] Assignee: Canon Kabushiki Kaisha, Tokyo, Japan

[22] Filed: Aug. 14, 1975

[21] Appl. No.: 388,270

[30] Foreign Application Priority Data
Aug. 16, 1972 Japan.............................. 47-82000
Aug. 26, 1972 Japan.............................. 47-85589
Sept. 13, 1972 Japan.............................. 47-91970
Aug. 30, 1972 Japan.............................. 47-100271

[52] U.S. Cl. ............... 354/173; 354/204; 354/212; 354/266; 242/71.5; 352/121
[51] Int. Cl. ........................................... G03b 19/04
[58] Field of Search ........... 354/204, 205, 212, 213, 354/258, 266, 173; 242/71.5; 352/121

[56] References Cited
UNITED STATES PATENTS
3,656,420    4/1972    Aizawa et al. ...................... 354/173

Primary Examiner—Robert P. Greiner
Attorney, Agent, or Firm—Toren, McGeady and Stanger

[57] ABSTRACT

A wind up electric motor which performs film wind up and shutter charging, etc. and a release electric motor which performs shutter release are connected to a power source through a change over switch, and an electromagnetic relay which is activated by a release button is made ON and OFF, to change over said change over switch in its connection, thereby the above mentioned wind-up electric motor and the release electric motor are driven alternately.

13 Claims, 14 Drawing Figures

ELECTRICALLY DRIVEN CONTROL DEVICE FOR A CAMERA

BACKGROUND OF INVENTION:

1. Field of the Invention

The present invention relates to an electric driving device for a camera in which film wind up, shutter charging and shutter release are done by electric motors.

2. Description of the Prior Art

Heretofore as an electric driving device for a camera, there has been one which conducts wind up and shutter release with one motor and one which conducts the same with separate motors. In the former type in which said action is done by one motor, a relay contact of an electro-magnetic relay which is activated by operation of a shutter button is used as a change over switch for alternately activating the wind up and the shutter release. Therefore as an electromagnetic relay is used in this type in which one motor is used, restrictions in designing arrangement of such related equipment as a remote control device and plural number of synchronized photographing devices can be remarkably reduced, but since the wind-up and the shutter release are done by one motor, a spring must have energy accumulated therein during film wind-up operation by the motor so that the shutter release is done by releasing said accumulated energy. Therefore it is unavoidable that the shutter release action becomes impact-giving, thus having such shortcomings as giving bad effect on the durability of the shutter of a camera or causing blurring of a camera. In the latter type in which the wind-up and the shutter release are done by separate motors, a manually operated switch is used as a change over switch for alternately activating the wind-up and the shutter release. Therefore, as the shutter release and the wind-up are done by separate motors, the above mentioned shock at the time of shutter release can be avoided, but it has such shortcomings that there is restrictions in designing the arrangement of such related equipment as a remote control device and plural number of synchronized photographing devices, etc. since a manually operated switch is used to have the wind-up and shutter release done alternately.

First object of the present invention is to eliminate the above mentioned shortcomings, and is to perform the shutter release and the wind-up by separate motors and at the same time a relay contact of an electro-magnetic relay which is functioned by the operation of a release button is used as a switch to conduct alternately the wind-up function and the shutter release function.

Second object of the present invention is to provide a switch between the wind-up motor and a power source to perform change over of a single frame photographing and a continuous photographing.

Third object of the present invention is to have the photographing number of frames changed consecutively every second in association with the operation of the release button.

Fourth object of the present invention is to conduct next wind up as shutter running is completed so that appropriate exposure can always be obtained.

Fifth object of the present invention is to have such series of operations as wind-up starting — wind-up completion — release starting — release completion — wind-up starting performed stepwise so that the mechanism functions in a stable manner and is made in compact size.

Sixth object of the present invention will become apparent from the concrete examples of the present invention which will be explained below in details.

BRIEF DESCRIPTION OF THE DRAWINGS:

FIG. 13 (A)(B) are schematic drawings for the function of the mechanism shown in FIG. 12.

DESCRIPTION OF THE PREFERRED EMBODIMENTS

Figure 1:
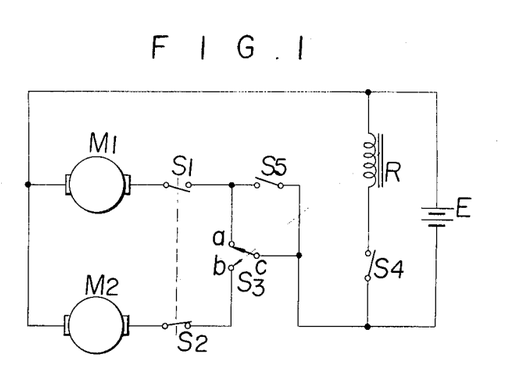
FIG. 1 is a circuit diagram to show a basic arrangement of the electric driving device for a camera according to the present invention.

Now, an example of the present invention will be explained referring to the drawings. FIG. 1 is to show a basic circuit arrangement in the present invention, wherein E is a power source battery and an electro-magnetic relay R and a switch $S_4$ which is linked with operation of a release button are connected in series to the both ends of said battery E. The plus electrode end of the battery E is connected to a fixed contact $a$ of a change over switch $S_3$ with a wind-up motor $M_1$ and a switch $S_1$ being intervened therebetween in series. The plus electrode end of the battery E is also connected to a fixed contact $b$ of the change over switch $S_3$ with a release motor $M_2$ and a switch $S_2$ being intervened therebetween in series. The movable contacting piece C of said change over switch is connected to the minus electrode end of the battery E. The above mentioned wind-up motor $M_1$ performs winding up of film and charging of shutter, etc., while the release motor $M_2$ conducts shutter release action. The above mentioned switches $S_1$ is linked with the switch $S_2$, and the switches $S_1$ and $S_2$ perform alternatively ON-OFF functions by wind-up completion and release completion to drive the wind-up motor and the release motor. The above mentioned change over switch $S_3$ is to change over its movable contacting piece C to the fixed contacts $b$ or $c$ depending on whether the above mentioned electro-magnetic relay R is excited or not excited. A switch $S_5$ which changes over a single frame photographing and a continuous photographing is connected between the fixed contact $a$ and the movable contacting piece $c$ of the change over switch $S_3$.

Figure 2:
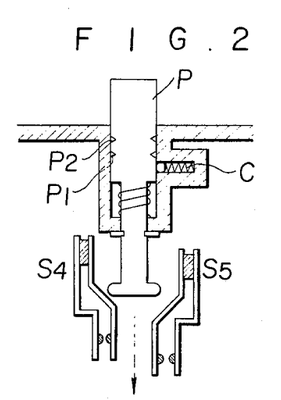
FIG. 2 is an arrangement drawing to show a release part of FIG. 1.

FIG. 2 is to show a release part of the device shown in FIG. 1. In FIG. 2, P is a release button, $P_1$ and $P_2$ are notched groove provided on the periphery of the release button P. C is a click stop member and $S_4$ and $S_5$ are switches shown in FIG. 1 and become ON as the button P is pressed down.

Now the function of the device with the above mentioned arrangement will be explained. First explanations will be made on a case when a single frame photographing is done. The state shown in the drawing shows the state of wind-up completion, that is the switch $S_1$ is OFF, the switch $S_2$ is ON, and the movable contacting piece $c$ of the change over switch $S_3$ is changed over to the fixed contact $a$. In this state as the release button P is pressed down and the click C engages with the groove $P_1$, the switch $S_4$ is ON and the switch $S_5$ is OFF. As the switch $S_4$ becomes ON, the electro-magnetic relay R is excited and the movable contacting piece $c$ of the change over switch $S_3$ is changed over from the fixed contact $a$ to $b$. By this the current from the battery E flows through a circuit consisting of the plus electrode of the battery E — release motor $M_2$ — switch $S_2$ — change over switch $S_3$ — minus electrode of the battery E, rotating the release motor $M_2$ to perform release action of a camera. When a release completion state is reached a release completion detection mechanism which is not shown in the drawing is started. By this a linking switch is changed over, and the switch $S_1$ becomes ON, while the switch $S_2$ becomes OFF, thus the rotation of the release motor $M_2$ is stopped. Then as the pressing down of the release button P is released the electro-magnetic relay R has its exciting eliminated, the movable contacting piece $c$ of the change over switch $S_3$ is changed over from the fixed contact $b$ to $a$. In this state the current from the battery E flows through a circuit consisting of the plus electrode of the battery E — wind-up motor $M_1$ — switch $S_1$ — change over switch $S_3$ — minus electrode of the battery E, rotating the wind-up motor $M_1$ to perform wind-up of film and charging of shutter. And as the state of wind-up completion is reached, a wind-up detection mechanism which is not shown in the drawing is initiated. By this, the linking switch is changed over and the switch $S_1$ becomes OFF while the switch $S_2$ becomes ON. Therefore the wind-up motor $M_1$ has its rotation stopped. Since a single frame photographing is done and the camera is retained in a wound up state by the above mentioned process, the above function can be repeated by operating the release button P again.

Next, explanations will be made on a case when continuous photographing is done. As the release button P is so pressed down as having the click C engage with the groove $P_2$, both the switch $S_4$ and switch $S_5$ become ON. By this the electro-magnetic relay R is excited and the movable contacting piece $c$ of the change over switch $S_4$ is changed over from the fixed contact $a$ to $b$ and is retained there. But, as the switch $S_5$ is ON, the release motor $M_2$ and the wind-up motor $M_1$ perform repeatedly the shutter release and wind-up alternately by ON-OFF action of the switches $S_1$ and $S_2$, thus continuous photographing is done. When the pressing down of the release button P is released the change over switch $S_3$ is changed over to the fixed contact $a$, therefore the camera will be retained in a state wind-up is completed.

Next a modification of the circuit of FIG. 1 will be explained using FIG. 3. Same parts as in FIG. 1 will be explained with same identification numbers or marks. S is a starting control circuit provided at the circuit of the wind-up motor $M_1$, and is to control the starting of the wind-up motor $M_1$ in relation with shutter speed, further to detect completion of the action of shutter after completion of release for starting the wind-up motor $M_1$. B is a control circuit provided in parallel with the release motor $M_2$, and this control circuit B is an electric control circuit to ensure the function of the release motor $M_2$. J is a jack being connected in parallel with the switch $S_4$, and this jack is to have various accessories such as timer, etc. connected.

Figure 3:
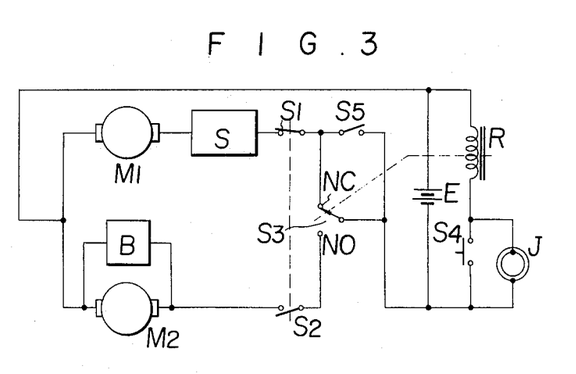
FIG. 3 is a circuit diagram made by modifying a portion of the circuit diagram of FIG. 1.
Figure 4:
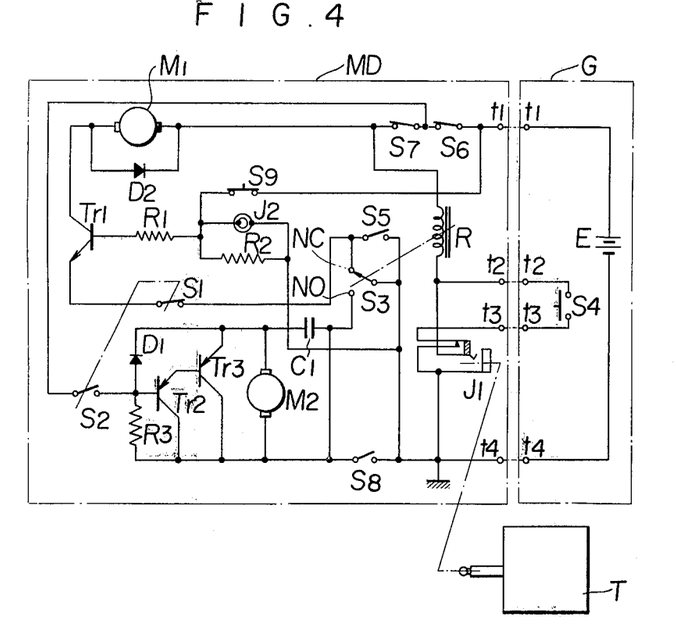
FIG. 4 is a circuit diagram to show FIG. 3 in concrete manner.

FIG. 4 is to show the circuit of FIG. 3 in a concrete manner. MD is a main body of a motor drive, and G is a power source unit. T is such accessary unit as timer unit or others, and is plugged in to the jack J of the MD unit. The MD unit and the power source unit are connected by connecting terminals $t_1 - t_4$. In the drawing the same parts as in FIG. 3 are shown with same numbers or marks. A switch $S_6$ is a main switch, $S_7$ is a switch which becomes OFF as film has no balance. $S_8$ is a switch to prevent the release motor $M_2$ from being stopped in a middle of a cource of release, and $S_9$ is a switch which becomes OFF only when a shutter screen is running after release. $J_2$ is a jack to have such part as for example as servo-EE-device connected. Transistor $Tr_1$, resistances $R_1$, $R_2$ and the above mentioned switch $S_9$ in a camera charging circuit composes a control circuit equivalent to the S in FIG. 3, while transistors $Tr_2$, $Tr_3$, a diode D and a resistance $R_3$ in a release circuit composes an electric control circuit for the motor $M_2$ and is equivalent to B in FIG. 3. $C_1$ and $D_2$ are noise elimination element of the motor.

While the function of said device is about same as that of the basic circuit shown in FIG. 1, explanations will be made on the function of the control circuit S and the control circuit B. Now, such case is taken up that current flows through the release motor $M_2$ and release action is done and the shutter is started. At such time, the switch $S_9$ becomes OFF and the transistor $Tr_1$ of the control circuit is in OFF state. Then, as the release action is completed the linking switches $S_1$ and $S_2$ are changed over and the wind-up motor $M_1$ is connected to a power source, but since the switch $S_9$ is OFF and the transistor $Tr_2$ is OFF while the shutter screen is running, current will not flow through the wind-up motor $M_1$ and the wind-up action will not be started. Next as the shutter screen completes running the switch $S_9$ becomes ON and the transistor $Tr_1$ becomes ON, thus wind-up action is started. By this the wind-up action will be done surely after completion of closing of the shutter screen.

Next the transistors $Tr_2$, $Tr_3$ of the control circuit are placed in OFF state by the action of $D_1$ and $R_3$ when the switch $S_2$ is ON, but when $S_2$ is changed to OFF, both $Tr_2$, $Tr_3$ become ON, shortcircuiting between both terminals of the release motor $M_2$, thus control force is given to the motor $M_2$, and the release action is surely performed. When, for example, a timer unit T is plugged in to the jack J, the switch $S_4$ which is operated by the release button is separated with the jack, and the timer unit T is connected in series to the electro-magnetic relay R, and the electro-magnetic relay R will be controlled by the action of the timer, thus timer photographing can be done. Also, for example a remote control unit, etc. is plugged in to J, the electromagnetic release device can be activated in same manner.

Figure 5:
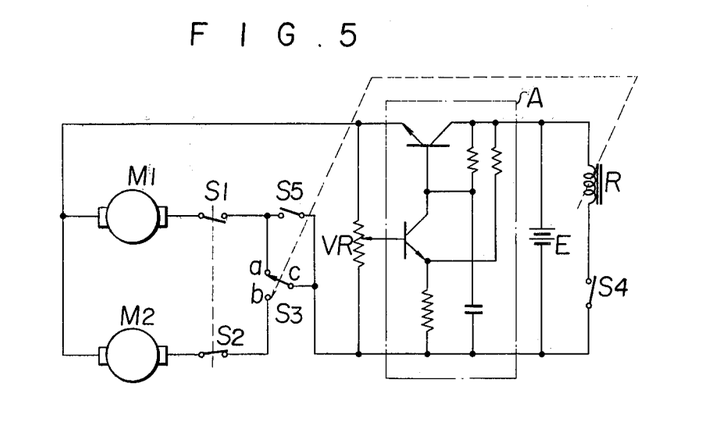
FIG. 5 is a circuit diagram in such state that the circuit shown in FIG. 1 is applied for a device to change number of frames to be photographed.
Figure 6:
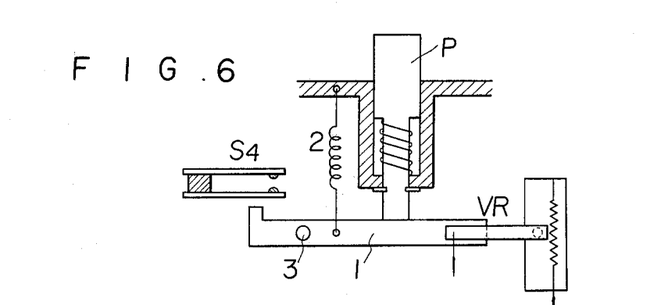
FIG. 6 is an arrangement drawing to show a release part used in FIG. 5.

Now, explanations shall be made for a case when the basic circuit in FIG. 1 is applied to a photographing frame number changing device. First explanations will be made on a case when the change of photographing frame number is done by changing electric potential of a supply power source referring to FIG. 5. In FIG. 5 same parts as in FIG. 1 are shown with same numbers or marks, and A is a circuit to control the electric voltage supplied to the wind-up motor $M_1$ and the release motor $M_2$. VR is a variable resistance for adjusting the control circuit A. FIG. 6 shows a release part of this device, wherein P is a release button. As this release button P is pressed down, a member 1 is rotated to clockwise direction around a center, fulcrum 3 against a spring 2, making the switch $S_4$ ON and at the same time the variable resistance VR will be continuously changed.

As the function of such photographing frame number changing device as mentioned above is basically similar to the example shown in FIG. 1, detailed explanations of the same will be omitted. The control circuit A is composed of well known transistor circuit, and by changing the input voltage thereto with the variable resistance VR, the voltage of the motor circuit to be supplied from the power source E through the control circuit A is changed. Therefore, when the variable resistance VR is varied by the pressing down of the release button P with such release device as shown in FIG. 6, the rotating speed of the motors $M_1$ and $M_2$ is varied in a continuous manner, thus the photographing frame number per second can be varied in a continuous manner. When the switch $S_5$ is placed in ON state continuous photographing is done while one frame photographing is done when the switch $S_5$ is placed in OFF state.

Figure 7:
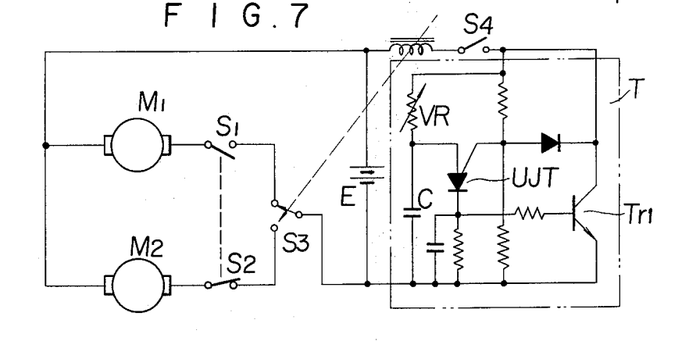
FIG. 7 is a circuit diagram to show another example of the circuit shown in FIG. 5.

FIG. 7 shows a photographing frame number changing device as in FIG. 5 and the photographing frame number per second is changed in a continuous manner by the release operation. In this example parts marked by broken line replace the control circuit A in FIG. 5, and same parts as in FIG. 5 are shown with same numbers or marks and concrete explanations therefor will be omitted. T within the broken line shows a timer circuit, VR is a variable resistance having its resistance value changed with release action, C is a condensor composing a time constant circuit together with the variable resistance VR, and UJT is a unijunction-transistor. $Tr_1$ is a switching transistor.

Next function of said device will be explained. The drawing shows the state just after a camera is changed, and linking switches $S_1$, $S_2$ are placed in OFF and ON state, respectively, by wind-up completion signal.

When a photographer presses down the release button P shown in FIG. 6 the member 1 is rotated to clockwise direction around a center, fulcrum 3 against the spring 2, placing $S_4$ in ON state, first. By this the timer circuit T is started and the electro-magnetic relay R is excited by such time constant factor as determined by the variable resistance VR and the condensor C. The change over switch $S_3$ is changed over from $a$ to $b$. By this the release motor $M_2$ is started by a camera release circuit, that is E(+) — $M_2$ — $S_2$ — $S_3$ — E(−). The linking switches $S_1$, $S_2$ are reversed by release completion signal (signal detection part is not shown in the drawing), and the switch $S_1$ becomes ON while $S_2$ becomes OFF, and the relay R has its magnetism eliminated, placing the switch $S_3$ in ON to $a$ side. Then the wind-up motor $M_1$ is started by a camera charging circuit, E(+) — $M_1$ — $S_1$ — $S_3$ — E(−). Next, the linking switches $S_1$, $S_2$ are reversed again by the wind-up completion signal, and $S_1$ is placed in OFF state, $S_2$ in ON state. Then the relay R is excited again after such length of time as determined by time constant factor of the timer circuit T, and the switch $S_3$ is changed over from $a$ to $b$ thus the original state is resumed.

Since a series of operations such as camera charging, camera release, etc. are repeated with intervals of such time constant factor as determined by the variable resistance VR of the timer circuit T and the condensor C, when the variable resistance VR is continuously changed by the release button P, the photographing frame number per second can be changed.

Figure 8:
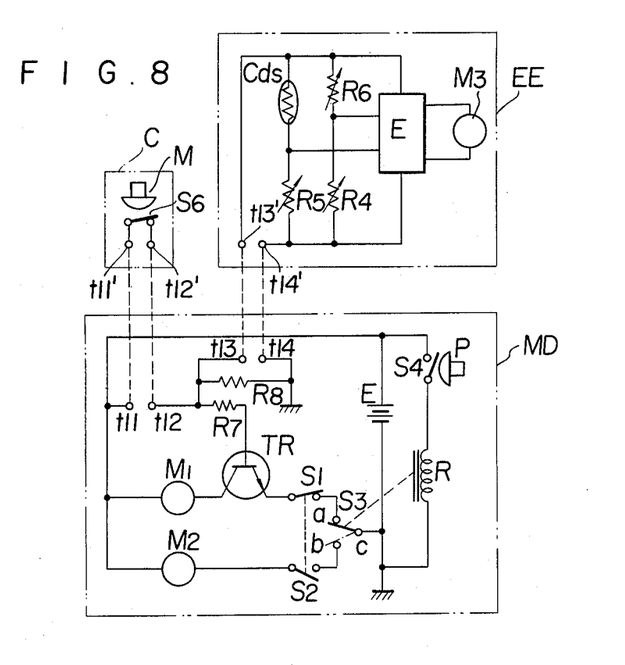
FIG. 8 is a circuit diagram in such state that the circuit shown in FIG. 1 is applied to a proper exposure setting device.

Next, FIG. 8 shows a case when the circuit of FIG. 1 is applied to a proper exposure setting device, wherein same parts as in FIG. 1 will be explained with same numbers and marks. In the drawing, EE is an exposure control unit employing a servo-motor $M_3$, and has such bridge circuit connected to power source terminals $t_{13}$, $t_{14}$ as consisting of a photo-electric conversion element CdS and a group of variable resistors, $R_4$, $R_5$, $R_6$ which correspond to variation of ASA sensitivity, diaphragm value and shutter time, etc., and the unit has a servo-motor $M_3$ for driving lens diaphragm connected to its output end through an amplification circuit E. Said exposure volume determining circuit will not be limited to said arrangement. MD is a motor drive unit and has a wind-up motor $M_1$ for film wind-up and shutter charging, a release motor $M_2$ and is connected to a power source E in parallel, having such arrangement that a switch $S_1$ and a switch $S_2$ are inserted in each motor circuit, respectively in a mutually linked manner so that the switch $S_1$ is OFF and $S_2$ is ON when wind-up and charging by the motor $M_1$ are completed, while the switch $S_1$ is ON and $S_2$ is OFF at the time when the release is completed by the motor $M_2$. Since the mechanism to detect the completion of charging or completion of release to conduct change over of switches $S_1$, $S_2$ can be of publicly known means in mechanical or in electro-magnetic manner, thus it is omitted from the drawing. $S_4$ is a switch which is closed by the pressing down of the release button P to supply electricity to a relay coil R and changes over the change over switch $S_3$ between the circuit of the wind-up motor $M_1$ and the circuit of the release motor $M_2$ from the fixed contact $a$ to the fixed contact $b$.

A transistor TR is inserted in the circuit of the wind-up motor $M_1$, and terminals $t_{11}$, $t_{12}$ are provided between the base thereof and a power source E, then terminals $t_{13}$, $t_{14}$ containing resistors $R_7$, $R_8$ are provided at the base circuit, and are connected to the terminals $t_{13}$, $t_{14}$ of the above mentioned exposure control unit EE.

C is a switching circuit at a camera and has a switch $S_6$ which becomes OFF while the shutter is running and terminals $t_{11}$, $t_{12}$ which are connected to the terminals $t_{11}$, $t_{12}$ of the motor drive unit MD. A member M to drive said switch $S_6$ is linked with such suitable mechanical member as mirror-up of a camera, stopping down of lens by a stop-down lever and others and is so made as being closed at ordinary time and opened only when the shutter is running.

The drawing shows the state of wind-up, wherein $S_1$ is ON, $S_2$ is OFF, $S_3 \rightarrow$ NC, $S_5$ is ON, transistor TR is ON and the circuit $E(+) \rightarrow M_1 \rightarrow TR \rightarrow S_1 \rightarrow (S_3 \rightarrow NC) \rightarrow E(-)$ is closed, then the motor $M_1$ performs film wind-up and shutter charging. When said wind-up is completed, a detecting mechanism works to convert the switch $S_1$ to OFF and $S_2$ to ON, and the motor M is stopped.

When the release push button P is pressed the switch $S_4$ is closed and the relay switch $S_3$ is changed over to "b" and the release action is started by the motor $M_2$ to make the shutter run. By release completion signal $S_1$ is changed to ON and $S_2$ to OFF, thus the motor $M_2$ is stopped. At the same time as the shutter running is stopped the switch $S_6$ is ON while TR is ON and wind-up is started by the motor $M_1$.

Since current is supplied from the power source to the exposure control unit EE through the terminals $t_{13}$, $t_{14}$ which are in series with the terminals $t_{11}$, $t_{12}$ which control the wind-up motor $M_1$, when the switch $S_6$ is off that is while shutter is in operation the servo motor $M_3$ will not rotate, thus unit EE is retained at the state before the exposure action is started thus proper exposure can be obtained.

Figure 9:
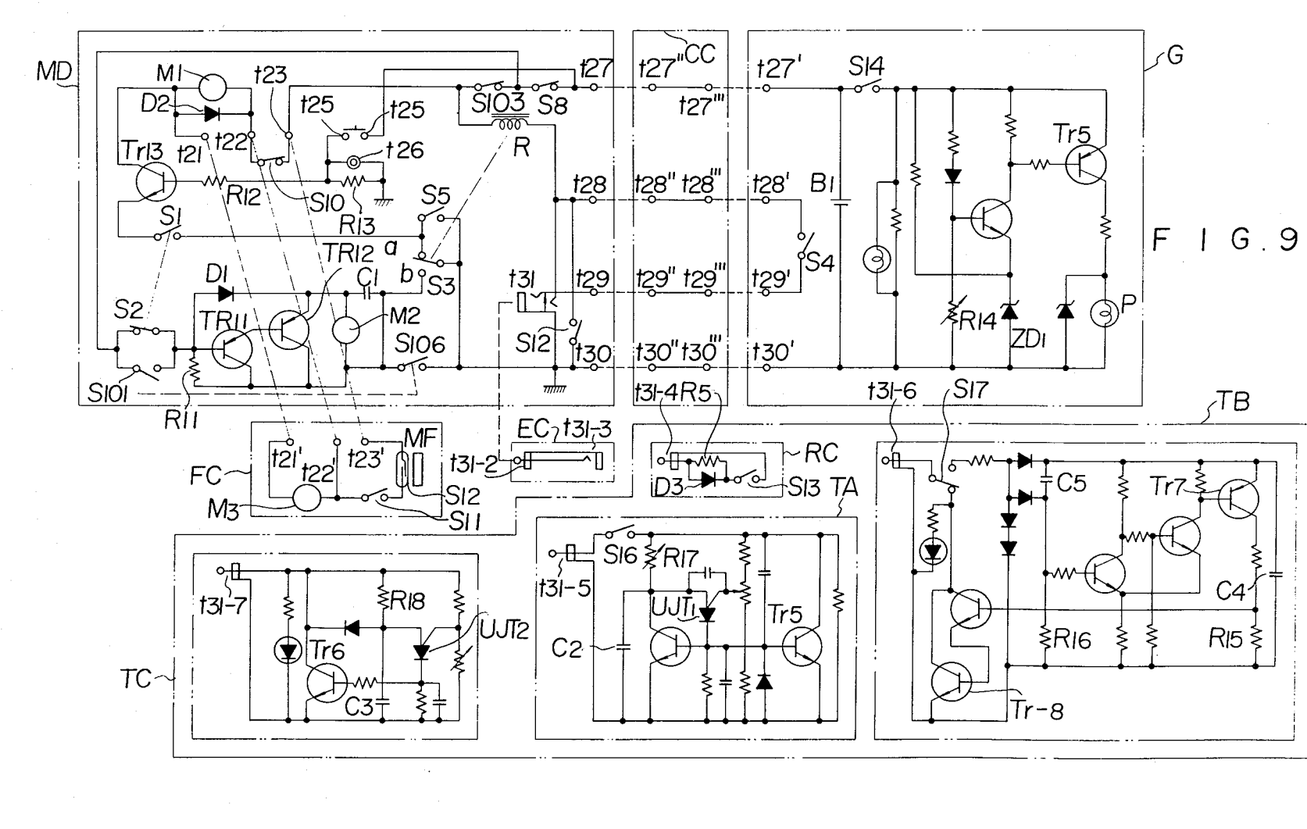
FIG. 9 is a circuit diagram of a device to perform a series of function from wind-up to release in stepwise manner, to which the circuit of FIG. 1 is applied.

FIG. 9 shows a case when the circuit of FIG. 1 is applied to a device in which a series of operations from wind-up to release are done stepwise, wherein same parts as in FIG. 1 are shown with same numbers or marks. In the circuit shown in FIG. 9, MD is a motor drive unit to control a wind-up mechanism and a release mechanism, G is a release unit having checker function for power source voltage, FC is a film chamber unit, CC is a connecting cord unit, EC is an extension unit, RC is a remote switch unit, TA is a timer unit, TB is a self timer unit, and TC is a short timer unit.

Figures 10, 11:
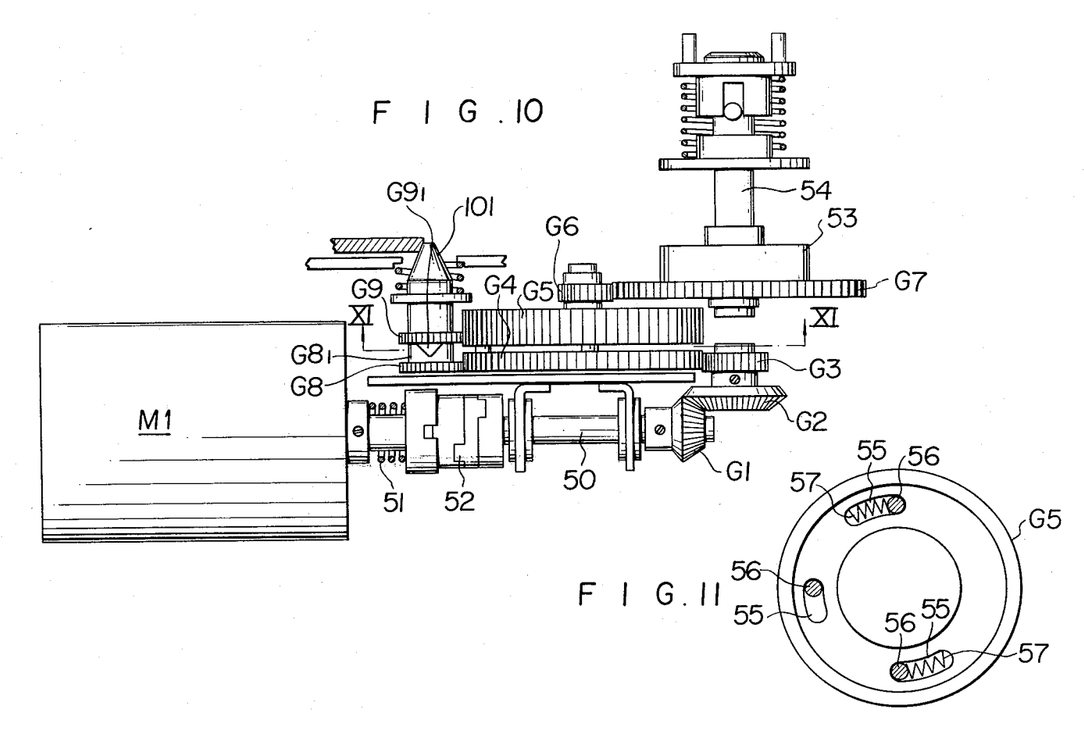
FIG. 10 is a front elevation of a film wind-up mechanism of the device shown in FIG. 9.
FIG. 11 is a cross-sectional view taken along the line II — II in FIG. 10.

FIG. 10 is to show a film wind-up mechanism having a device containing the circuit of FIG. 9. $M_1$ is a driving motor, 50 is a rotating axle connected to a motor shaft through a compression spring 51 and a universal coupling 52. $G_1$-$G_4$ and $G_5$-$G_7$ are a group of reduction gears, and 53 is an one way clutch placed between the gear $G_7$ and a film wind-up axle 54.

The gear $G_4$ and gear $G_5$ are connected by a rotation absorbing mechanism. This rotation absorbing mechanism has such arrangement that long holes 55 and pins 56 which are provided on opposing faces of the gears $G_4$, $G_5$ are engaged together and springs 57 are provided to push the pins 56 to one end walls of the long holes 55.

$G_8$, $G_9$ are gears engaging with the gears $G_4$, $G_5$ and axles $G8_1$, $G9_1$ for said gears are coupled together with oblique planes, wherein the gear axle $G9_1$ moves up and down as an up and down member 1 by the difference in rotation of both axles, generating shutter release signal.

Figure 12:
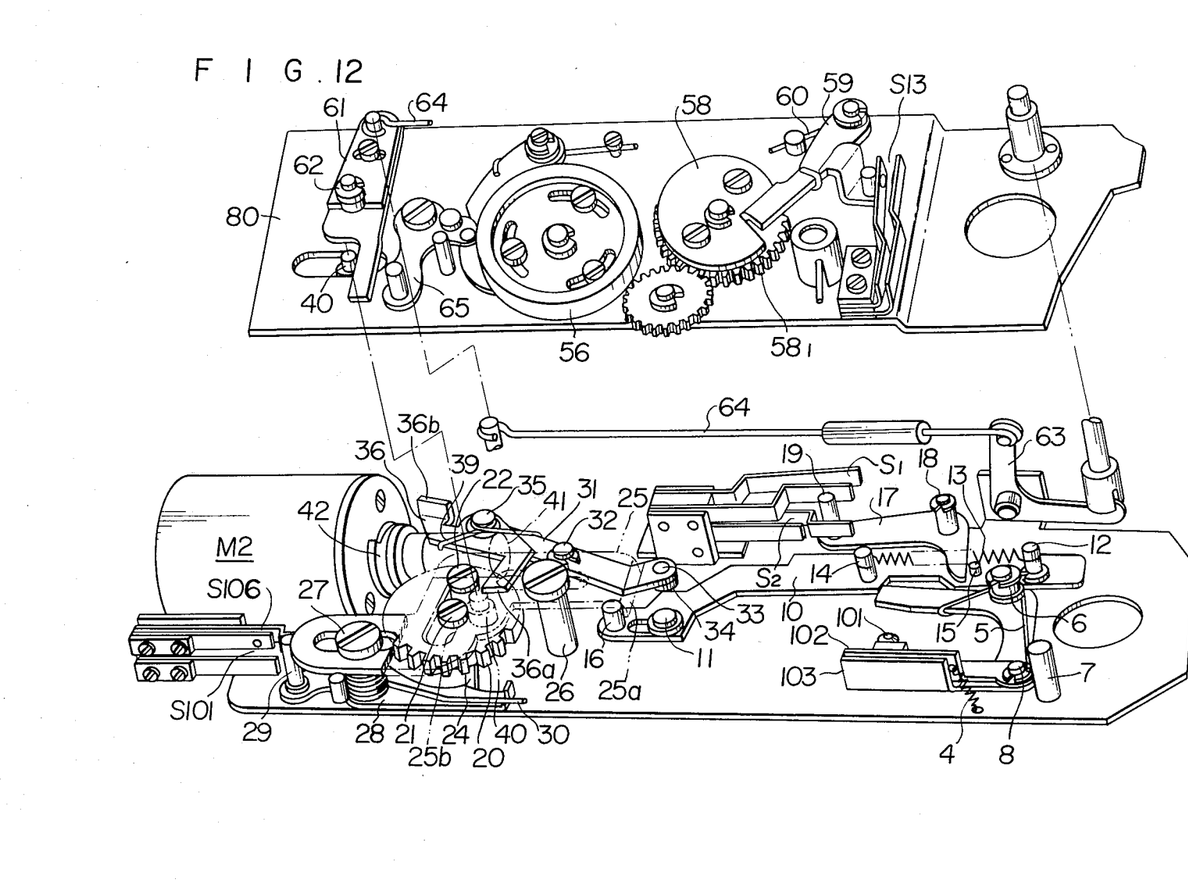
FIG. 12 is an oblique view of a shutter release mechanism of the device shown in FIG. 9.

FIG. 12 shows a shutter release mechanism which functions receiving the shutter release signal generated at the film wind-up mechanism of FIG. 9. In the drawing, 56 is a film counter axially supported on a shelf plate 80. 58 is a cam plate which is linked with gear to the film counter 56. 59 is a lever always pressure contacted to outer periphery of the cam plate 58 by a spring 60, and drops into a concave part $58_1$ of the cam plate 58 when remaining number of film becomes zero to place a switch $S_{103}$ in a circuit to supply current to the motor $M_1$ in OFF state. 61 is a release lever which rotates around a center, an axle 62. 63 is a lever linked to a release button of a camera. 64 is a rod to connect the levers 61, 63. 65 is a lever to drive the film counter 56 in association with the lever 61.

103 is a check lever rotated by an up and down member 101 and is rotatably provided at a base plate 66 with an axle 6, and is given a rotating bias to clockwise direction by a returning spring 5. 7 is a pin to which the spring 5 is placed. 102 is an adjusting lever rotatably provided to the check lever 103 with an axle 8, and rotating bias is given to said lever by a spring 4 so that it always contacts the up and down member 101 with a constant gap by a spacer 9.

10 is a control slider guided by pins 11, 12 provided on a base plate 66, and biased to right hand direction by a spring 13. 14 is a pin on which the spring 13 is placed. 15, 16 are pins provided on the control slider 10. 17 is a switch operating lever driven by the pin 15 and is rotatably provided on the base plate 66 by an axle 18, and has a switch operating pin 19 provided on its surface.

20 is a worm wheel driven by the shutter release motor $M_2$ through a worm 41, and is rotatably supported on the base plate 66 with an axle 21, further has on its surface a pin 22 and has at symmetrical position at 180° on its reverse face pins 23, 24. 25 is a release slider which is biased by the pin 22 to make reciprocal movement and is guided by pins 26, 27 on the base plate 66. A bent part 25 at end of the slider 25 engages with the pin 16 on the control slider 10.

28 is a lever to control the switches $S_{101}$, $S_{106}$ by opening and closing the same and has a switch operating pin 29, further is rotatably supported at an axle 27 and is biased to rotate by a spring 30 to counter clockwise direction. 31 is a control lever rotatably provided with an axle 32 to the base plate 66, and a roller 34 is provided at one end of said lever by an axle 33, while a check lever 36 is rotatably attached to the other end of the same by an axle 35. The roller 34 is placed at such position as engageable with the control slider 10, while an end part 36a of the lever 36 is at such position as engageable with the pin 22, and the other end part 36b is at such position as engageable with a check claw 42 provided on an axle of the motor $M_2$. 37 is a spring to give the lever 31 rotating force to clockwise direction. 38 is a pin on which the spring 37 is placed. 39 is a spring to give the lever 36 the rotating force to clockwise direction. 40 is a shutter release pin provided on the slider 25.

Figure 13A:
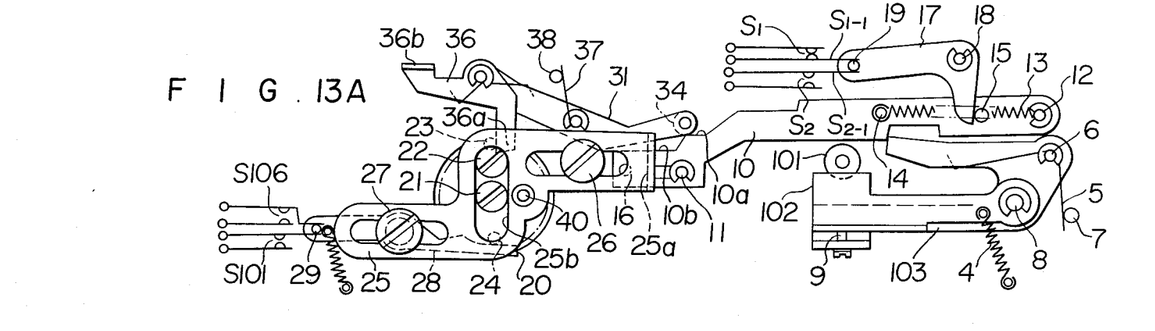

Next, function of the device of the present invention will be explained. FIG. 12 and FIG. 13(A) show the state during the course of film wind-up, wherein as the switches $S_8$, $S_{103}$, $S_1$ are ON the circuit to supply current to the film wind-up driving motor $M_1$ becomes ON and a circuit to supply current to the shutter release driving motor $M_2$ becomes OFF.

And as film wind-up completion state is reached, a torque sensor is activated, that is, the up and down member 101 ascends, the lever 3 is rotated to counter-clockwise direction through the lever 2. By this the engagement between the lever 3 and the control slider 10 is released, and the control slider 10 moves to right direction in the drawing by tension of the biassing spring 13. By this the lever 17 which has been restricted by the pin 15 is rotated to counter-clockwise direction by restoring force of the contact arm $S_{1-1}$ of the switch $S_1$ (the restoring force of the contact arm $S_{1-1}$ is greater than that of the contact arm $S_{2-1}$), and the pin 19 changes over the switch $S_1$ to OFF, the switch $S_2$ to ON.

As the switch $S_1$ becomes OFF the circuit to supply current to the motor $M_1$ becomes OFF and the film wind-up driving system is stopped. Then as the switch $S_2$ becomes ON the circuit to supply current to the motor $M_1$ will be prepared. On the other hand as the slider 10 is shifted the roller 34 which is contacting with the stepped part 10a of the same is moved to a low stepped part 10b of the same by a spring 37 and the control lever 31 is rotated to clockwise direction. At this time the lever 36 also is rotated to clockwise direction and its end part 36a is evacuated from the rotating zone of the pin 23, while the other end part 36b is evacuated from the rotating zone of the check claw 42. By this the shutter release driving motor $M_2$ has both mechanical check and electrical check released thus functional preparation is completed.

Figure 13B:
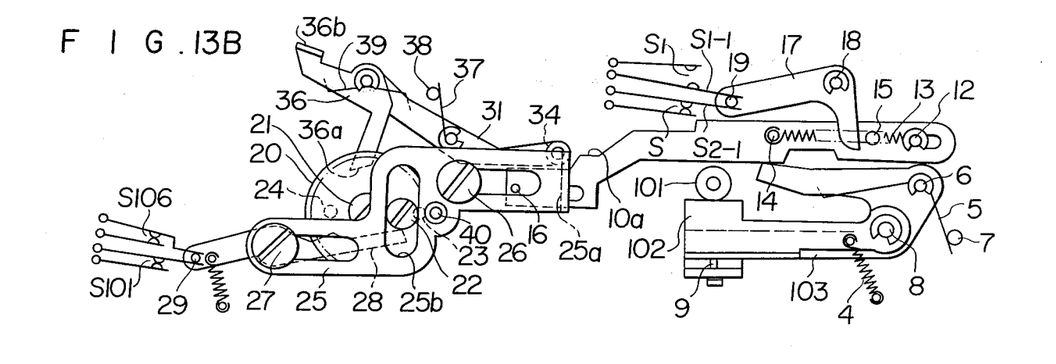

Next, as an operator operates a push button (not shown in the drawing), a relay L functions and changes over the switch $S_9$ to contact b. Then the motor $M_2$ has voltage impressed to its current supply circuit and is started. The rotation of the motor $M_2$ rotates the worm wheel 20 to clockwise direction through the worm 41 and moves the slider 25 to right direction by the engagement between the long hole part 25b and the pin 22. By this movement the pin 40 on the slider 25 performs shutter release through the levers 61, 63. By rotation of the wheel 20 the lever 28 has its restriction by the pin 24 released and is rotated to counterclockwise direction by the tension of the biassing spring 30, and the pin 29 closes the switches $S_{101}$, $S_{106}$ (FIG. 5 (B)). Even if the operator accidentally leaves his hand off the release button returning the switch $S_3$ to the contact a, such state as having voltage impressed will be retained as the switch 106 is ON.

The transposition of the slider 25 becomes the largest at a position where the wheel 20 is rotated by 90 degree completing the shutter release action. And as the wheel 20 further continues rotation at the position where it is rotated 180° the end part 25a of the slider 25 will become engaged with the pin 16 on the slider 25. When the rotation of the wheel 20 further proceeds, the slider 25 is shifted to left direction and the slider 10 is shifted to left direction against the spring 13.

By this shifting the slider 10 engages again with the lever 3. At this time the pin 15 rotates the lever 17 to clockwise direction changing over the switches $S_2$ and $S_1$ to OFF and ON, respectively, again. As the switch $S_1$ becomes ON the circuit to supply current to the motor $M_1$ completes its preparation for supplying current.

On the other hand even if the switch $S_2$ becomes OFF, as the switch $S_{101}$ which is in parallel with the switch $S_2$ is ON, the circuit to supply current to the motor $M_2$ is still retained in its voltage impressing state. Also by the restoration of the slider 10 the lever 31 returns to its original position, therefore the end part 36a of the check lever 36 on the lever 31 is shifted to the rotation zone of the pin 23 on the wheel 20. The wheel 20 further continues rotation and restores the position (A) of FIG. 5, and the pin 24 rotates the lever 28 to clockwise direction against the spring 30 before the completion of said restoration of the wheel 20. At this time finally the current supply circuit for the motor $M_2$ becomes OFF, and at the same time an electric braking works by the driving control transistors $TR_{11}$, $TR_{12}$.

Next as the pin 23 pushes the end part 36a of the check lever 36 to rotate the same and the other end part 36b is placed at the rotating zone of the check claw 42, the check claw 42 and the end part 36b engage each other to place the motor $M_2$ in a completely stopped state, thus completing one cycle of the shutter release driving system.

As the operator leaves his hand off the release button at this time, the switch $S_3$ is changed over to the contact a and voltage is impressed to the current supply circuit for the motor $M_1$, returning to the state to start film wind-up.

While the above are explanations for one frame photographing, in case of continuous photographing, by retaining the switch $S_5$ in ON state as long as the operator keeps pushing the operating button voltage is impressed alternately to the current supply circuits for the motors $M_1$ or $M_2$, repeating the cycles of film wind-up — shutter release, then as the operating button is released, at such time of cycle that it proceeds from the state in which film wind-up is completed to starting of the motor $M_2$, the device is stopped at the state film wind-up is completed as the switch $S_3$ becomes OFF.

In the present invention, when rotating member at the film wind-up mechanism is stopped by wind-up completion, the rotation of the rotating member at the driving source is absorbed by a rotation absorbing mechanism, then an up and down member is activated utilizing the difference in rotation of said both rotating members to generate shutter release signal, therefore shutter release becomes possible only after completion of film wind-up, thus the invention is very effective in securing stable operations, making the device compact and making adjustment work easy.

What is claimed is:

1. An electrically driven control device for a camera comprising;
    a power source,
    an electro-magnetic relay connected to both terminals of said power source,
    a first switching means connected to said electromagnetic relay and controlled to ON or OFF by operating a release button,
    a wind-up driving means connected between both terminals of the above mentioned power source to conduct film wind-up and shutter charging,
    a release driving means connected between both terminals of the above mentioned power source to conduct shutter release,
    a second switching means connected to the above mentioned wind-up driving means and placed in ON state by completion of said shutter release,
    a third switching means connected to the above mentioned release driving means and placed in ON state by completion of said wind-up, and
    a change over means being placed between the above mentioned power source and the wind-up driving means also the release driving means and changed over by the action of the above mentioned electro-magnetic relay and is connected to the above mentioned release driving means, wherein said change over means is changed over and connected to the wind-up driving means at the time when the above mentioned electro-magnetic relay is not in operation.

2. The electrically driven control device for a camera claimed in claim 1, which further comprises a fourth switching means between the above mentioned power source and the above mentioned wind-up driving means to conduct change over between one frame photographing and continuous photographing.

3. The electrically driven control device for a camera claimed in claim 2, in which the fourth switching means is controlled to ON or OFF in an association with the operation of the release button.

4. The electrically driven control device for a camera claimed in claim 2, which further comprises a means to couple an auxiliary control device in parallel with the first switching means.

5. The electrically driven control device for a camera claimed in claim 2, which comprises a starting control means connected to the above mentioned wind-up driving means to control the starting of said driving means.

6. The electrically driven control device for a camera claimed in claim 2, which further comprises a control means to effect control of the above mentioned release driving means in parallel with said release driving means.

7. The electrically driven control device for a camera claimed in claim 2, in which the above mentioned power source includes a power source voltage control means to change the number of photographing frames photographed per unit time during continuous photography.

8. The power source voltage control means for the electrically driven control device for a camera claimed in claim 7, which further comprises a variable resistance to determine the value of the power source voltage wherein said variable resistance is adjusted by operating the release button.

9. The electrically driven control device for a camera claimed in claim 1, in which the above mentioned power source has a timer circuit for changing the speed of the driving means.

10. The timer circuit in the electrically driven control device for a camera claimed in claim 9, which further comprises a time constant circuit consisting of a variable resistance and a condensor, said variable resistance being adjusted by operating the release button.

11. The electrically driven control device for a camera claimed in claim 1, which further comprises a fifth switching means which becomes OFF while the shutter is in operation and is connected to the above mentioned wind-up driving means.

12. The electrically driven control device for a camera claimed in claim 11, in which the fifth switching means has an input terminal of an exposure control means connected thereto.

13. The electrically driven control device for a camera claimed in claim 2 which further comprises an up and down member in which a rotating member being coupled to a driving axle of the above mentioned wind-up driving means is coupled with a rotating member at the film wind-up mechanism by a rotation absorbing mechanism, wherein a shutter release mechanism is activated by the difference in rotation of said rotating members by said rotation absorbing members.

* * * * *

UNITED STATES PATENT OFFICE
CERTIFICATE OF CORRECTION

PATENT NO. : 3,898,679
DATED : August 5, 1975
INVENTOR(S) : MITSUTOSHI OGISO, H. AIZAWA and S. KOZUKI It is certified that error appears in the above-identified patent and that said Letters Patent are hereby corrected as shown below:

In the heading of the patent:

The filing date should read:

--[22]   Filed :   August 14, 1973

Signed and Sealed this seventh Day of October 1975

[SEAL]

Attest:

RUTH C. MASON
*Attesting Officer*

C. MARSHALL DANN
*Commissioner of Patents and Trademarks*